United States Patent
Pountney

(10) Patent No.: US 10,273,992 B2
(45) Date of Patent: Apr. 30, 2019

(54) PANEL SUPPORT AND/OR PANEL MOUNTING MEANS

(71) Applicant: PIZAZZ INTERNATIONAL LIMITED, Auckland (NZ)

(72) Inventor: David Grenville Pountney, Auckland (NZ)

(73) Assignee: PIZAZZ INTERNATIONAL LIMITED, Auckland (NZ)

( * ) Notice: Subject to any disclaimer, the term of this patent is extended or adjusted under 35 U.S.C. 154(b) by 0 days.

(21) Appl. No.: 15/505,759

(22) PCT Filed: Aug. 12, 2015

(86) PCT No.: PCT/NZ2015/050107
§ 371 (c)(1),
(2) Date: Feb. 22, 2017

(87) PCT Pub. No.: WO2016/028165
PCT Pub. Date: Feb. 25, 2016

(65) Prior Publication Data
US 2017/0268548 A1    Sep. 21, 2017

(30) Foreign Application Priority Data
Aug. 22, 2014 (NZ) ........................ 629222

(51) Int. Cl.
| A47F 1/14 | (2006.01) |
| F16B 5/06 | (2006.01) |
| F16B 2/12 | (2006.01) |
| G09F 7/18 | (2006.01) |
| G09F 15/02 | (2006.01) |

(52) U.S. Cl.
CPC ............. *F16B 5/0635* (2013.01); *F16B 2/12* (2013.01); *G09F 7/18* (2013.01); *G09F 15/02* (2013.01); *G09F 2007/1847* (2013.01)

(58) Field of Classification Search
CPC .......... F16B 2/12; F16B 5/0635; G09F 15/02
USPC .................................... 248/473, 495
See application file for complete search history.

(56) References Cited

U.S. PATENT DOCUMENTS

| 3,251,569 A * | 5/1966 | Rynearson ............. A47G 1/164 |
| | | 248/328 |
| 4,566,665 A * | 1/1986 | Rynearson ............. A47G 1/202 |
| | | 248/493 |
| 6,299,123 B1 * | 10/2001 | Hayde .................. A47B 95/008 |
| | | 248/476 |

(Continued)

FOREIGN PATENT DOCUMENTS

| EP | 2602420 A2 * | 6/2013 | ............... E06B 7/28 |
| FR | 2900040 A1 * | 10/2007 | ............... A47H 1/10 |

OTHER PUBLICATIONS

International Search Report, PCT/NZ2015/050107, dated Oct. 15, 2015.

*Primary Examiner* — Gwendolyn W Baxter
(74) *Attorney, Agent, or Firm* — Young & Thompson

(57) ABSTRACT

Disclosed is a panel support including a block and a slide. The block has an aperture therein into which the slide can be inserted and the slide has a flange at or adjacent its distal end. A locking unit is provided actuable to substantially lock the slide in a desired position relative to the block so as to clamp a planar member between the slide and the block. Also described is a mounting system utilizing a plurality of panel supports carrying a planar member.

17 Claims, 7 Drawing Sheets

(56) References Cited

U.S. PATENT DOCUMENTS

Figure 1:
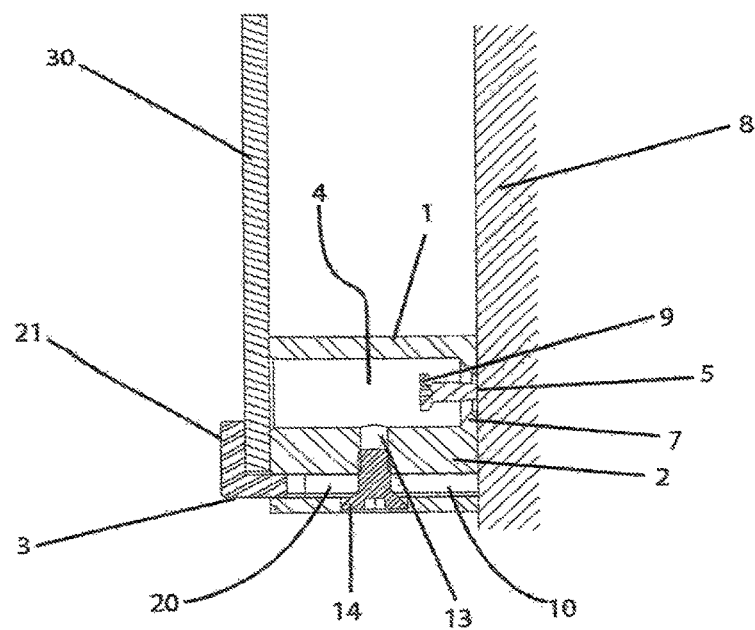

| | | |
|---|---|---|
| 6,550,731 B1 | 4/2003 | Kim |
| 9,504,309 B2 * | 11/2016 | Ralph ..................... A45F 5/021 |
| 2008/0178437 A1 | 7/2008 | Lottini et al. |
| 2011/0108698 A1 | 5/2011 | Chen |
| 2013/0036640 A1 | 2/2013 | Miller et al. |

* cited by examiner

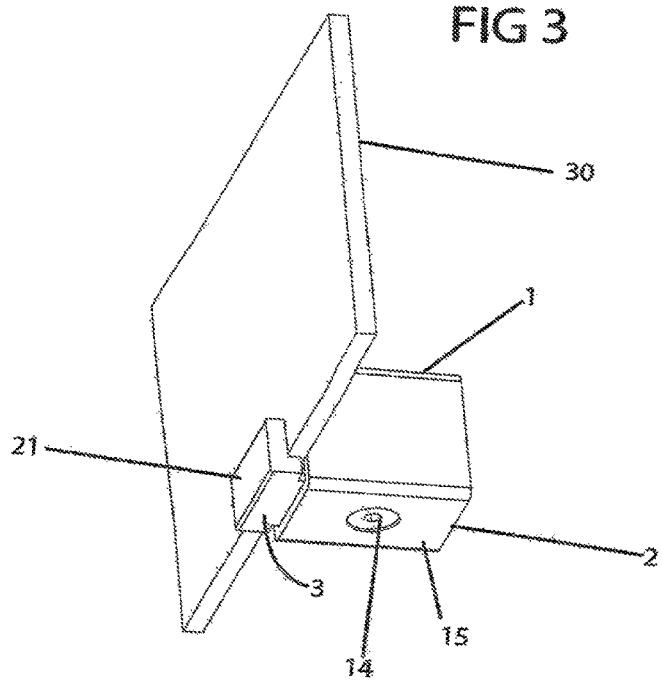
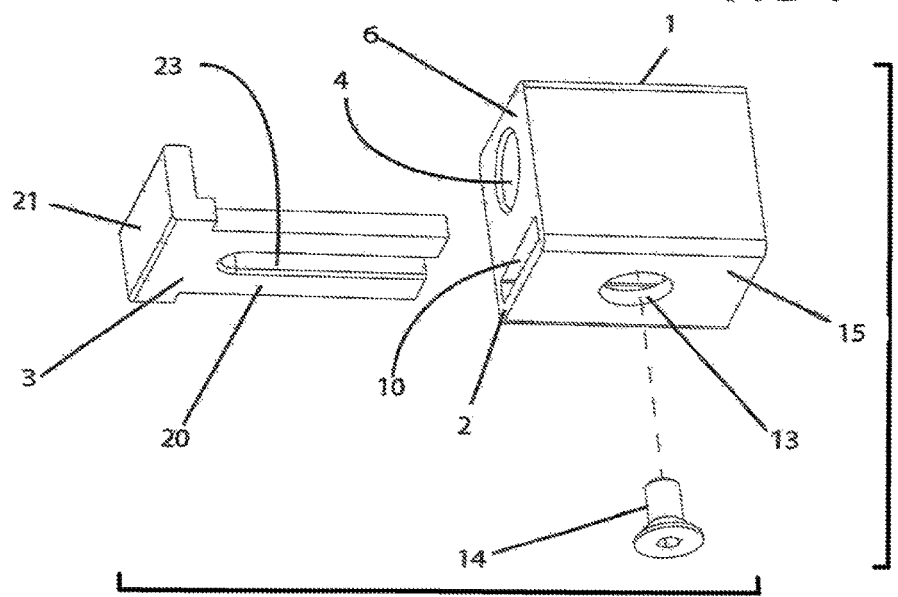

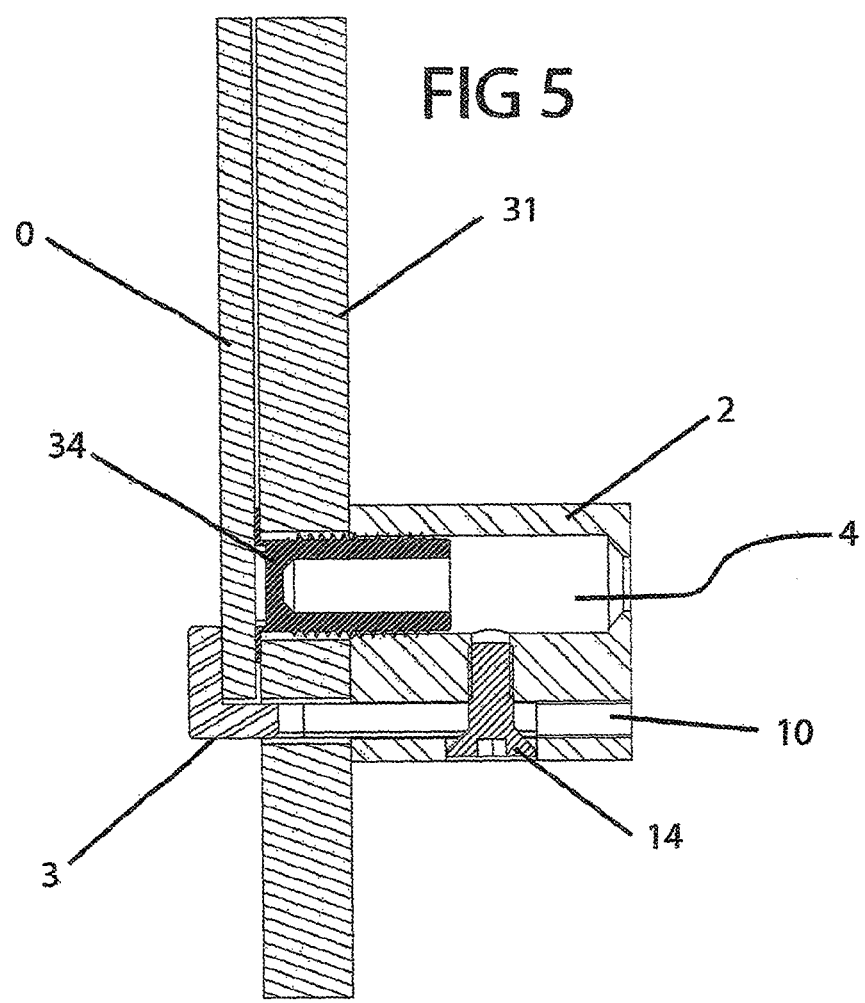

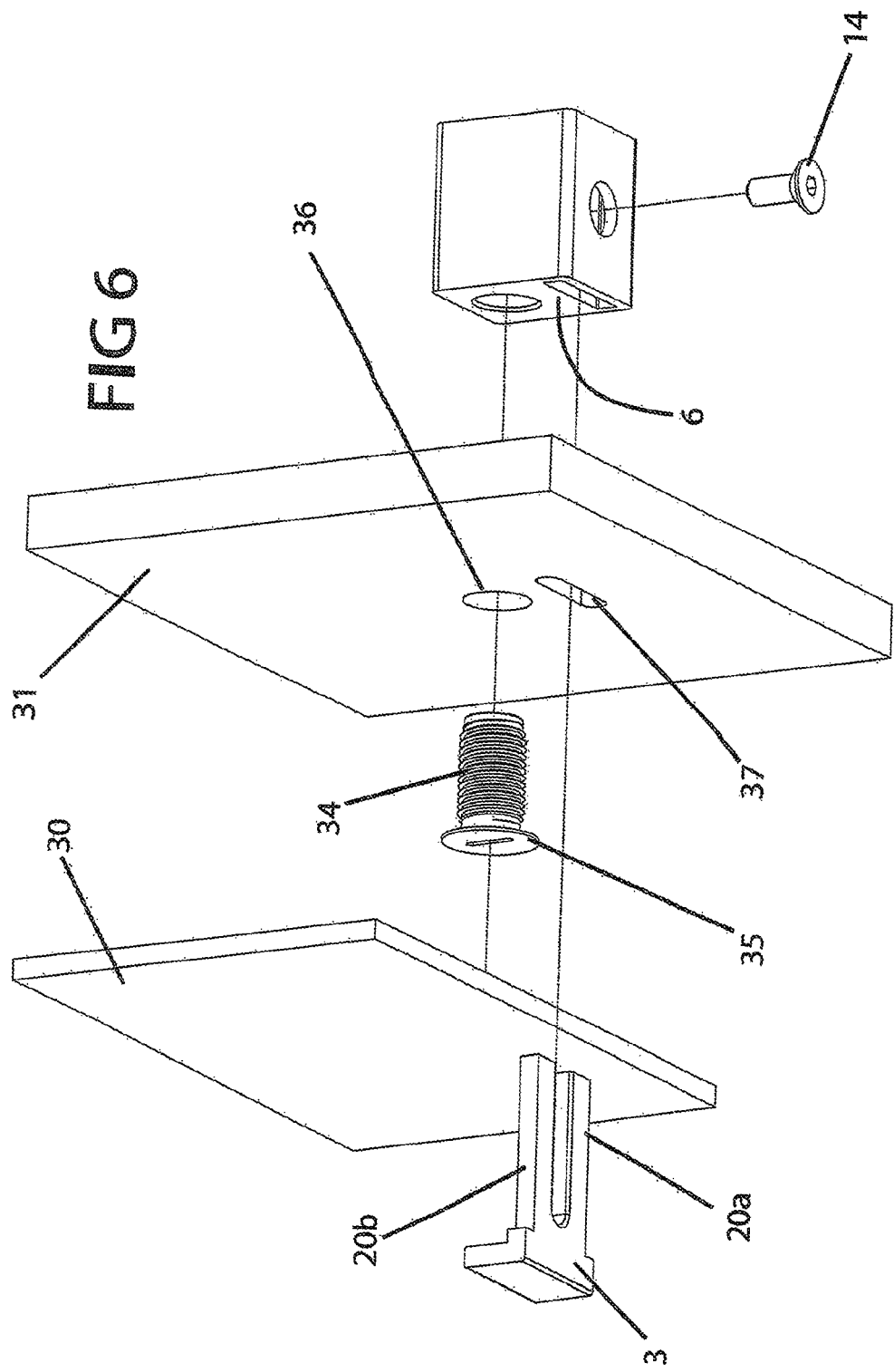

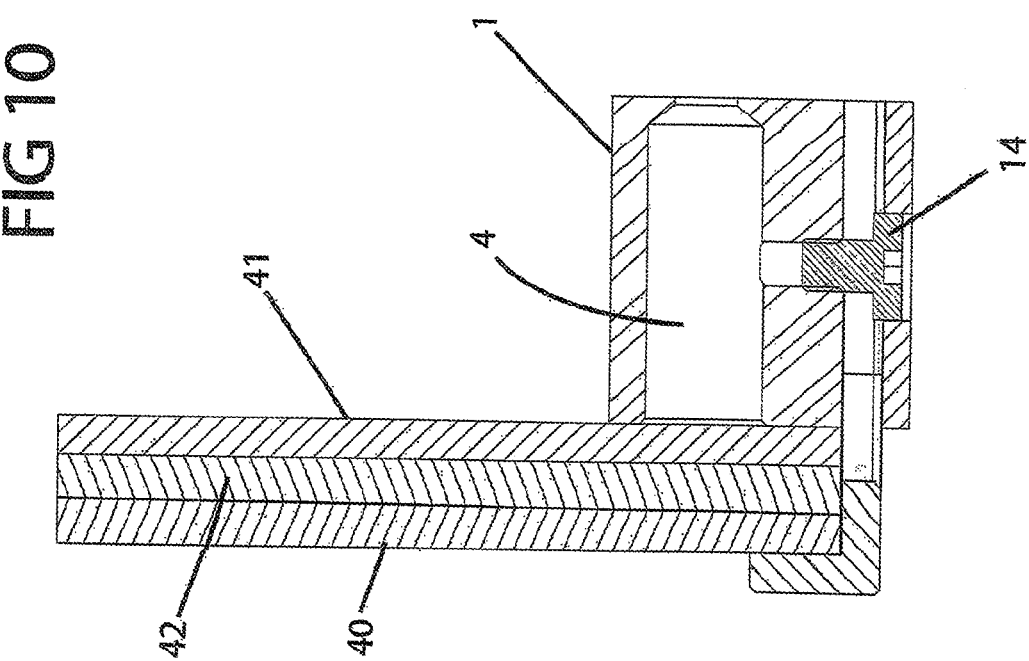
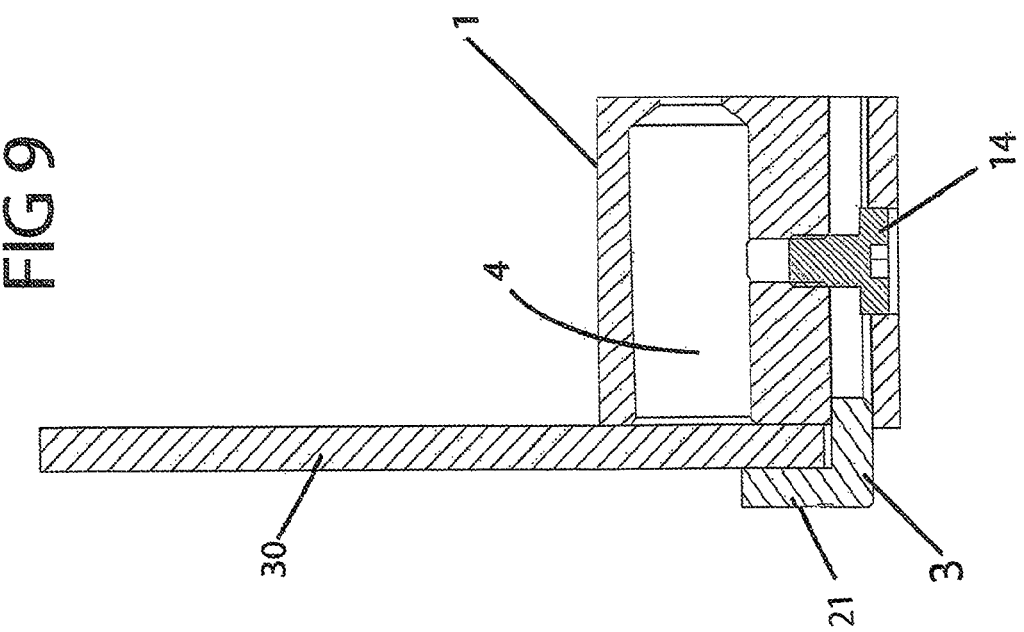

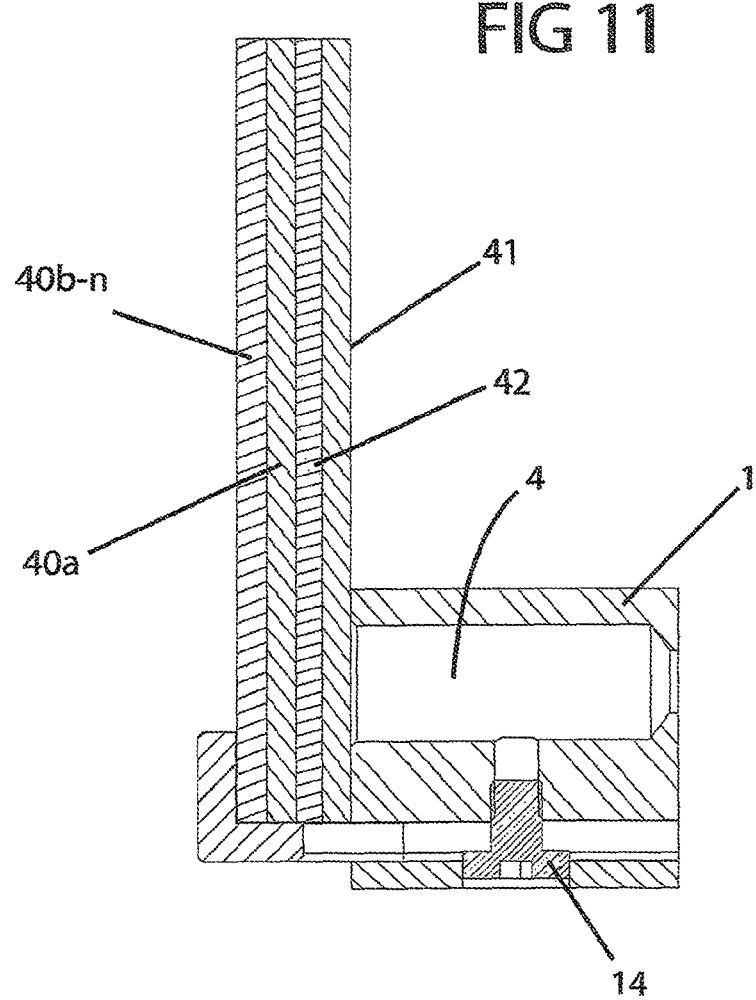

PANEL SUPPORT AND/OR PANEL MOUNTING MEANS

FIELD OF THE INVENTION

The invention relates to a Panel Support and/or a Panel Mounting System.

BACKGROUND OF INVENTION

A problem with existing methods of supporting panels to display graphic images, posters and other sheets of material is that frequently it is desired to display a poster and the mounting structure requires that holes are made through the graphic image, poster or other sheet of material. This is often undesirable. This need is even more so when the article to be mounted is for example a work of art in an art gallery, museum or similar.

PRIOR REFERENCES

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to, herein; this reference does not constitute an admission that any of these documents form part of the common general knowledge in the art, in New Zealand or in any other country.

Definitions

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

OBJECT OF THE INVENTION

It is an object of the invention to provide a panel support that ameliorates some of the disadvantages and limitations of the known art or at least provide the public with a useful choice.

SUMMARY OF INVENTION

In a first aspect the invention resides in a panel support comprising a block and a slide; the block having an aperture therein into which the slide can be inserted; the slide having a flange at or adjacent the distal end; and locking means being provided actuable to substantially lock the slide in a desired position relative to the block.

Preferably the slide is able to be secured in at least a number of selected positions relative to the block.

Preferably, the slide is substantially "L" shaped having a stem and the flange extending outwardly from the stem, the stem being bifurcated over at least a substantial length thereof.

Preferably the locking means comprises a further aperture in the block crossing the aperture that receives the slide, at least the inner parts of the further aperture being shaped to receive a locking member passing into the further aperture and through the slot formed by the bifurcation so that the locking member engages the slide to substantially lock the slide relative to the block.

Preferably a second locking means is provided to receive a second fixing device to the block.

Preferably the second fixing device comprises a screw or bolt engageable into the block.

In other aspects herein described the invention resides in one or more panel supports according to any one of the preceding paragraphs with the edge of a panel held between the block and the slide.

In a further aspect the invention resides in one or more panel supports according to any one of the preceding paragraph with a first panel abutting the slide and a second panel held between the first panel and the block.

Preferably the second panel has a pair of apertures through one of which the slide can pass and through the other of which the second fixing device can pass.

In a still further aspect the invention consists in a panel mounting system comprising a plurality of panel supports according to the preceding paragraphs and a panel able to be engaged with the panel supports.

Preferably the panel mounting system can include two panels held face to face between the slide and the block of each panel support.

Preferably the panel mounting system has more than two panels supported between the slide and the block.

Preferably the panel mounting system has at least two panels supported between the slide and the block with a planar member between the two panels or between two of the panels.

Figure 2:
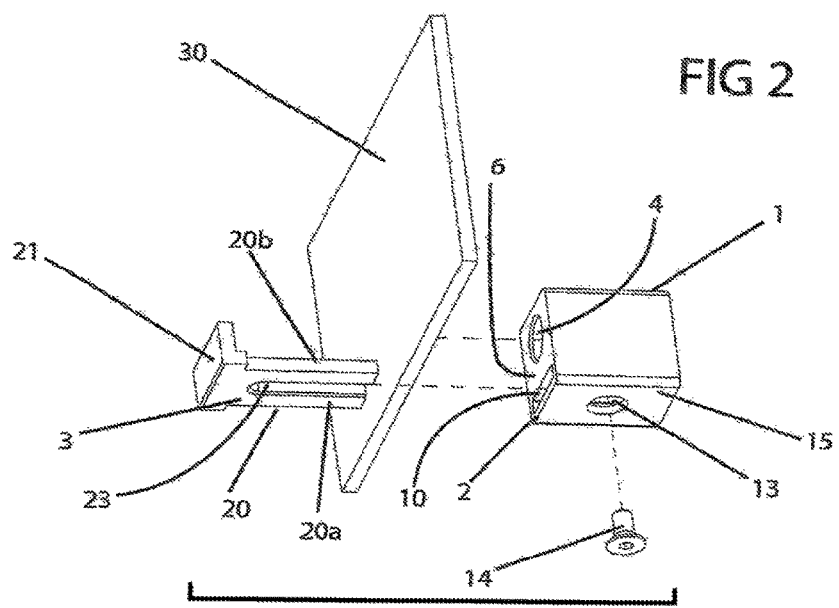
Figure 7:
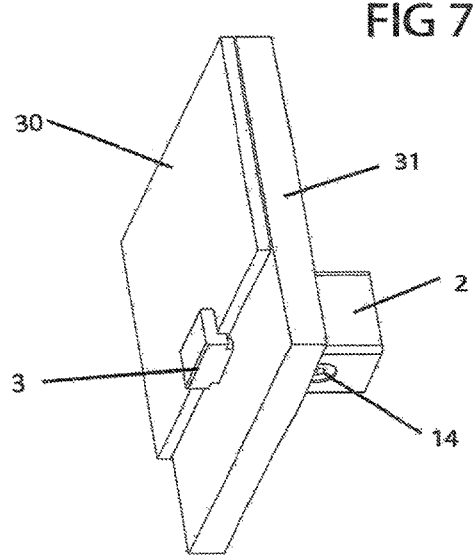
Figure 8:
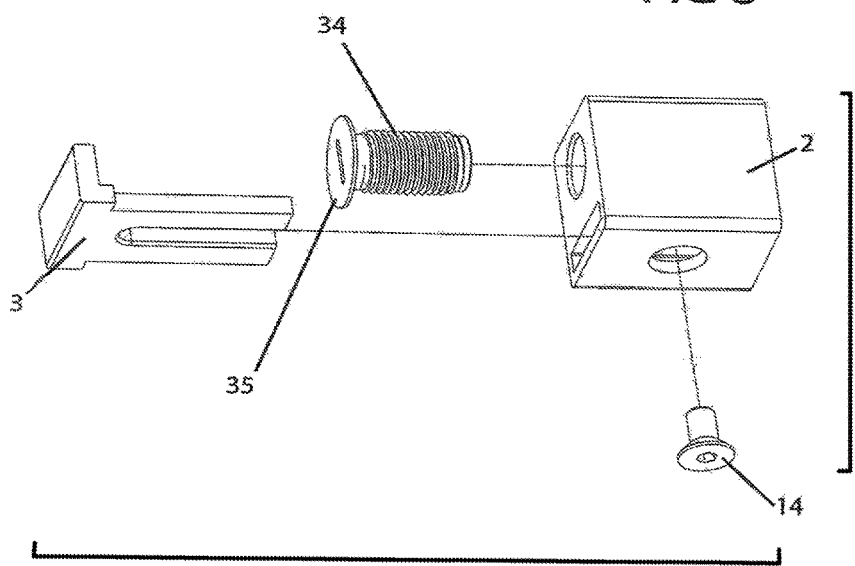

The invention will now be described, by way of example only, by reference to the accompanying drawings:

FIG. 1 is a cross sectional view of a panel support in accordance with a first preferred embodiment of the invention, FIG. 2 is an exploded perspective view of the panel support of FIG. 1, FIG. 3 is a view as in FIG. 2 but with the slide in a closed position, FIG. 4 is a view as in FIG. 2 but without the panel, FIG. 5 is a view as in FIG. 1 of an alternative panel support able to support two panels, FIG. 6 is a view as in FIG. 2 but of the panel support of FIG. 5, FIG. 7 is a view as in FIG. 3 but of the panel support of FIG. 5, FIG. 8 is a view as in FIG. 4 but of the panel support of FIG. 5, FIG. 9 is a view as in FIG. 1 but showing a flat shouldered fixing screw, and FIG. 10 is a view as in FIG. 9 of a further alternative construction showing three elements, being two panels placed on a panel support with a sheet of material therebetween.

FIG. 11 is a view of an embodiment of the invention similar to that of FIG. 10, arranged with additional elements.

DESCRIPTION OF THE PREFERRED EMBODIMENT

The following description will describe the invention in relation to preferred embodiments of the invention, namely a panel support and/or a panel mounting system. The invention is in no way limited to these preferred embodiments as they are purely to exemplify the invention only and that possible variations and modifications would be readily apparent without departing from the scope of the invention.

FIGS. 1 to 4 show a panel support 1, which is formed by a block 2 and a slide 3. The block 2 is able to be mounted on a supporting structure such as a wall 8 and this can be achieved by including a bore 4 in the block 2 which is of reduced diameter at the end 5. Thus a screw, fixing bolt or the like 9 can be inserted into the bore 4 from end 6 and screwed into the supporting structure 8 where the head of the screw or bolt will engage the material 7 around the edges of the aperture at end 5 to hold the block 2 in place on the supporting structure 8.

The block 2 also has an aperture 10 into which the slide 3 can be inserted. In the figures the aperture 10 has a rectangular cross-section as does the slide 3, but the aperture 10 could have other cross-sections to match the cross-section of the slide but it is believed that a rectangular cross-section is likely to be the preferred cross-section.

A further aperture 13 is provided in the block 2 which aperture 13 crosses the aperture 10 as can be seen, for example, in FIG. 1. The aperture 13 between the aperture 10 and towards the bore 4 is shaped to hold a screw 14, for example, and preferably by being threaded.

The aperture 13 between the aperture 10 and the face 15 of the block from which aperture 13 extends is preferably not threaded and is at least a little larger in diameter than the head of the screw 14. The head of the screw 14 which may have flat shoulders as seen in FIG. 9. Alternatively the head of the screw 14 may have sloped shoulders, as can be seen for example in FIG. 1, for the purpose hereinafter described. The flat shoulders are preferred as a better fit or greater contact area of the inner face of the head of the screw 14 with the slide is achieved.

The slide 3 has a stem 20 and a flange, upstand or rib 21 extending substantially at right angles to the length of the stem 20. The stem 20 is bifurcated to form two arms 20a and 20b (see FIG. 2) with a slot 23 between the two arms 20a and 20b. Thus the stem 20 of the slide 3 can be inserted into the aperture 10. Fixing means are provided to substantially lock or hold the slide 3 in the aperture 10 and the fixing means are provided by the interaction of screw 14 and the arms 20a and 20b. The width of the slot 23 is such that the threaded part of the screw 14 will pass between the arms 20a and 20b but the head of the screw 14 will not and the flat or sloped head of the screw 14 will bear against the arms 20a and 20b and desirably deflects the arms 20a and 20b a little against the wall of the aperture 10 opposite the head of screw 14 so as to clamp the slide between the head of screw 14 and the opposite wall of the aperture 10.

The block and slide can be formed of any suitable material such as a tough plastics material or metal.

The use of the panel support as described in FIGS. 1 to 4 is as follows. The block 2 is mounted on a supporting surface such as a wall. In practical terms more than one block would be mounted on the wall, the actual number depending on the size of panel 30 to be supported on the wall. Thus for a smaller panel two blocks may be sufficient but for larger panels three, four or more blocks may be needed. The blocks are mounted by passing fixing devices such as screws into the bores 4 and through the apertures 5 as above described. The slides 3 can then be partially inserted in the apertures 10 and the edge of the panel 30 brought into contact with the stem 20 of the slide 3. Once the panel 30 engages all stems 20 in use for that panel 30 the stems can be pushed further into the aperture 10 and fixing screws 14 tightened onto the arms 20a and 20b to hold the slide 3 in place. To remove the panel 30 the reverse procedure can be employed. The panels can be any article having a somewhat planar form, such as panels of flat usually rigid material such as MDF or HDMDF, ACM, posters, art works, slim line televisions, or other similar articles.

The construction of FIGS. 5 to 8 is somewhat similar save that it able to be used to support two panels 30 and 31 and this can be achieved as follows.

The bore 4 is threaded at or adjacent the end 6 thereof. A screw or bolt 34 is provided which engages the threads in the bore 4 and which has a relatively thin head 35. The panel 31 is provided with an aperture 36 through which the screw or bolt 34 can pass but not the head 35 and a further aperture 37 must be provided through which the arms 20a and 20b can pass. Generally only panel 31 would include apertures 36 and 37 but it will be apparent that more than one panel could be provided with such apertures and be mounted as for panel 31.

As a further alternative mounts at the bottom of the panels and some or all mounts at the side of panel 31 could be as for panel 31 in FIG. 6 but mounting at the, or the remaining, side, and the top edge of the panel could be as shown in FIGS. 1, 10 and 11.

The screw or bolt 34 can be screwed into the bore 4 where the head 35 of the screw or bolt 34, having a diameter larger than the diameter of the bore 4, will hold the panel 31 against the block 2 as seen in FIGS. 5 and 7. Thus in use the slide 3 can then be partially inserted in the aperture 10 after passing partially through the aperture 37. The panel 30 can then be mounted as described in relation to FIGS. 1 to 4. Again several blocks may be needed to hold the panels 30 and 31 securely.

A feature of this construction is that the panel 30 can be transparent or at least translucent and sheets of graphic images and/or other promotional material such as posters held between the panels 30 and 31 without damage to the graphic images, posters or other sheets of material.

As the head 35 is relatively thin there is little or no distortion of the panel 30 during use and yet the graphic images, posters, or other sheets of material can be securely held. Thus, for example, the head may be between substantially 0.5 mm thick and 0.75 mm thick.

FIG. 10 shows a construction which provides a transparent or at least translucent panel 40 and a backing panel 41 which may be transparent, translucent or opaque. Between the panels 40 and 41 is positioned a substantially planar member 42 which could be, for example, an art work, graphic image, or promotional material, or otherwise as desired. In this construction it would usually require that there be either two or more panel supports 1 at the bottom edge of the panels 40 and 41 or one or more panel supports 1 at each side edge of the panels 40 and 41, or indeed and desirably the panels 40 and 41 would be supported at the bottom edge in use by two or more panel supports 1 and by at least one panel support at each side edge of the panels 40 and 41 in use. One or more panel supports 1 could also be provided at the top edge in use of panels 40 and 41.

Of course in some instances more than one intermediate panel 42 can be positioned between the panels 40 and 41 or more than one panel 40 can be provided. FIG. 11 shows a first front panel 40a and further front panels 40b to n, where n is a selected number. The number n might typically be between 2 and 5 a practical upper limit for n may be about 10.

This embodiment of the invention does not require the provision of apertures in the panels 40, 41, and 42 for the slide to pass through as the panels 40, 41, and 42 sit on the slide or slides at the bottom edge of the panels 40 and 41.

However it will be apparent that at least panel 41 may be a panel constructed as for panel 31 in FIG. 6 with apertures as for apertures 36 and 37 in FIG. 6. Thus this panel or panels would be mounted as for panel 31 in FIG. 6 but the remaining panel or panels could sit on or be positioned against slide 20 as for FIGS. 10 and 11.

Advantages

A panel support is provided which can mount a panel on a supporting surface by gripping an edge of the panel. The panel support is simple to use yet effective and can be erected and dismantled quickly and easily. Furthermore if it is desired to change the panel, the changes can be effected from the front only. All that is required is to undo a screw on each panel support and then slide the panel out. An alternative panel can then be inserted and the screws re-tightened.

Variations

It will of course be realised that while the foregoing has been given by way of illustrative example of this invention, all such and other modifications and variations thereto as would be apparent to persons skilled in the art are deemed to fall within the broad scope and ambit of this invention as claimed.

The invention claimed is:

1. A panel support, comprising:
a block; and
a slide that has a stem and a flange,
the block having an aperture therein into which the stem of the slide can be inserted,
the flange extending outwardly from the stem,
the flange being at or adjacent the distal end of the stem, the stem having a slot over at least a substantial length thereof; and
locking means configured to substantially lock the stem in a selected position relative to the block by physical engagement of the locking means with the stem and so that the flange is located at a selected distance from the block,
wherein an edge of a panel is held between the block and the slide, and
wherein the panel has a pair of apertures through one of which the slide can pass and through the other of which a second fixing device can pass.

2. A panel support, comprising:
a block; and
a slide that has a stem and a flange,
the block having an aperture therein into which the stem of the slide can be inserted,
the flange extending outwardly from the stem,
the flange being at or adjacent the distal end of the stem, the stem having a slot over at least a substantial length thereof; and
locking means configured to substantially lock the stem in a selected position relative to the block by physical engagement of the locking means with the stem and so that the flange is located at a selected distance from the block,
wherein the locking means comprises a further aperture in the block crossing the aperture that receives the slide, at least the inner parts of the further aperture being shaped to receive a locking member passing into the further aperture and through the slot so that the locking member physically engages the slide to substantially lock the slide relative to the block.

3. The panel support as claimed in claim 2, wherein the slide is able to be secured in at least a number of selected positions relative to the block.

4. A panel mounting system comprising a plurality of panel supports according to claim 3 and a panel able to be engaged with the panel supports.

5. The panel mounting system as claimed in claim 4, wherein the panel mounting system includes two panels held face to face between the slide and the block of each panel support.

6. The panel mounting system as claimed in claim 4, having at least two panels supported between the slide and the block with a planar member between the two panels or between two of the panels.

7. A panel for use in a panel mounting system according to claim 4 comprising a planar member having an elongate slot therein, the slot being sized and positioned in said panel so that in use said slide can pass, in part, through said slot in said panel into the aperture in said panel support.

8. The panel as claimed in claim 7, wherein the panel has an aperture therein able to receive a further fixing device, the further fixing device having a head which does not pass through said aperture in said panel in use.

9. The panel support as claimed in claim 3, wherein the stem and the flange are configured so that the slide is substantially "L" shaped, the stem providing bifurcated arms over at least part of the length thereof to provide said slot.

10. The panel support as claimed in claim 3, wherein a second locking means is provided to receive a second fixing device to the block.

11. The panel support as claimed in claim 2, wherein the stem and the flange are configured so that the slide is substantially "L" shaped, the stem providing bifurcated arms over at least part of the length thereof to provide said slot.

12. The panel support as claimed in claim 2, wherein a second locking means is provided that engages with the block by way of a fixing device.

13. The panel support as claimed in claim 12, the second fixing device comprises a screw or bolt engageable into the block.

14. The panel support as claimed in claim 13, wherein the screw or bolt has a thin head, the head not entering the block in use.

15. The panel support according to claim 2, wherein an edge of a panel is held between the block and the slide.

16. The panel support according to claim 2, wherein a first panel abuts the slide and a second panel is held between the first panel and the block.

17. A kit of parts comprising one or more panel supports according to claim 2 and one or more panels able to mounted on a supporting surface by the one or more panel supports in use.

* * * * *